United States Patent
Konnola et al.

(10) Patent No.: US 10,133,716 B2
(45) Date of Patent: Nov. 20, 2018

(54) GENERATION OF NOTIFICATIONS IN A COLLABORATIVE DOCUMENT EDITING ENVIRONMENT

(71) Applicant: Documill Oy, Espoo (FI)

(72) Inventors: Mika Konnola, Espoo (FI); Terho Laakso, Espoo (FI); Rami Hanninen, Espoo (FI)

(73) Assignee: DOCUMILL OY, Espoo (FI)

( * ) Notice: Subject to any disclaimer, the term of this patent is extended or adjusted under 35 U.S.C. 154(b) by 0 days.

(21) Appl. No.: 15/390,253

(22) Filed: Dec. 23, 2016

(65) Prior Publication Data
US 2018/0181552 A1 Jun. 28, 2018

(51) Int. Cl.
G06F 17/00 (2006.01)
G06F 17/24 (2006.01)
G06F 17/22 (2006.01)
G06F 9/54 (2006.01)
G06F 17/30 (2006.01)

(52) U.S. Cl.
CPC ............ G06F 17/24 (2013.01); G06F 9/542 (2013.01); G06F 17/2288 (2013.01); G06F 17/30011 (2013.01)

(58) Field of Classification Search
CPC ................................................ G06F 17/30011
See application file for complete search history.

(56) References Cited

U.S. PATENT DOCUMENTS

| | | | | |
|---|---|---|---|---|
| 8,560,367 B2* | 10/2013 | Roth | ................. | G06F 17/30011 705/7.12 |
| 9,483,259 B1* | 11/2016 | Lee | ........................... | G06F 8/71 |
| 9,690,785 B1* | 6/2017 | Vagell | ............... | G06F 17/30011 |
| 9,807,073 B1* | 10/2017 | Miller | ..................... | H04L 63/08 |
| 2004/0103202 A1* | 5/2004 | Hildebrand | ......... | G06F 21/6209 709/229 |
| 2005/0120199 A1* | 6/2005 | Carter | ................. | G06F 21/6209 713/150 |
| 2009/0199274 A1* | 8/2009 | Frazier | .................... | H04L 63/08 726/4 |
| 2009/0234815 A1* | 9/2009 | Boerries | ........... | G06F 17/30867 |
| 2012/0284290 A1* | 11/2012 | Keebler | ............... | G06F 17/3089 707/756 |
| 2013/0212063 A1* | 8/2013 | Roth | ................. | G06F 17/30011 707/608 |

(Continued)

*Primary Examiner* — Laurie A Ries
(74) *Attorney, Agent, or Firm* — Young & Thompson

(57) ABSTRACT

The present invention relates to a solution for generating a notification relating to editing of a document in a collaborative document editing environment. The method includes: establishing the collaborative document editing environment at least by defining a plurality of users permitted to access the document; monitoring if the document is edited by the at least one user granted the right to edit the document; in response to a detection generating at least one notification representing at least one edit event performed by the at least one user granted the right to edit the document; and transmitting the at least one notification representing the at least one edit event to at least one recipient. Also disclosed is a system implementing the method and a processor-readable non-transitory medium storing processor-executable instructions for executing the method by a processor.

26 Claims, 4 Drawing Sheets

| Document XX | | |
|---|---|---|
| Editor (user) | Time stamp | Edit description |
| NN | t1 | Field T edited as follows: asdf -> fdsa |
| KK | t2 | Field R edited as follows: qwerty |
| MM | t3 | Field R edited as follows: qwerty -> yuiop |
| NN | t4 | Field T edited as follows: fsda -> fsd |

(56) References Cited

U.S. PATENT DOCUMENTS

| | | | | |
|---|---|---|---|---|
| 2014/0189818 A1* | 7/2014 | Meyer | .................... | G06F 21/62 |
| | | | | 726/4 |
| 2014/0304836 A1* | 10/2014 | Velamoor | ........... | G06F 21/6209 |
| | | | | 726/28 |
| 2015/0199318 A1* | 7/2015 | Lemonik | ............. | G06F 9/44526 |
| | | | | 715/255 |
| 2017/0041221 A1* | 2/2017 | Menezes | ............. | H04L 65/1016 |
| 2017/0083871 A1* | 3/2017 | Chang | ................ | G06Q 10/1095 |

\* cited by examiner

| USER PROFILE NN | |
|---|---|
| User ID | xyz |
| Password | pwd123 |
| Contact detail(s) | N.N@email.com |
| | |
| Accessible documents | Document ID(s) |
| | |
| Document rights | Full edit/partial edit/view |

| Document XX | | |
|---|---|---|
| Editor (user) | Time stamp | Edit description |
| NN | t1 | Field T edited as follows: asdf -> fdsa |
| KK | t2 | Field R edited as follows: qwerty |
| MM | t3 | Field R edited as follows: qwerty -> yuiop |
| NN | t4 | Field T edited as follows: fsda -> fsd |

GENERATION OF NOTIFICATIONS IN A COLLABORATIVE DOCUMENT EDITING ENVIRONMENT

TECHNICAL FIELD

The invention concerns in general the technical field of collaborative digital working environment. More particularly, the invention concerns editing of a document in a collaborative document editing environment where a plurality of users may be involved in the document editing process.

BACKGROUND

Nowadays digital computing environments enable so called collaborative working environments in which a plurality of users are integrated over a communication network to cooperate around a common task. An example of such a situation is when an electronic document is arranged to be simultaneously accessible for a plurality of users and the users may perform pre-determined operations, even in real-time, to the document. For example, users may modify a content of the document together, e.g. write a book, and through the online collaboration arrangement increase efficiency in the creation of the document in question.

Traditionally, the collaborative document editing environment was implemented so that it enabled a single user to edit a document at the time. In practice this meant that users were allowed to edit the document serially (one user at any given time), each user taking his/her turn on making modifications to the document. This was called turn-based document editing. Users just had to be able to access the document (file), carry out the edits, and save the modified version back to the storage system. For the storage system, this required ability to lock a document file to be editable to just one user at a time. This capability was fundamental in file systems, shared network file drives and much later on, also in so called cloud-based file storage services which were initially designed to mimic the functionality of shared network file drives. Some of these systems offered other capabilities like versioning (version history) support, which turned out to be quite handy when enabling multiple users to edit a certain document, each user taking their turn, and versioning system capturing modifications made, allowing users to revert back to a certain previous version if needed.

Today, key aspect is that many document management systems, enterprise portals and cloud services enable users to upload their documents for storing purposes, as well as enable others to edit them as already mentioned above. Besides relying only on users to notify other users about the fact that a certain document has been modified or deleted, or about a new document made available for others to edit—these systems offer notification system which let other users to know about the actions a certain user did, either automatically, or based on users' voluntary action. As these systems authenticate users accessing and editing document, they use users' identity and enable other users to get (almost) instant notifications in case their action might be needed, or just in order to keep them informed what other user(s) just did.

This kind of automated notification system which tracks and communicates system's and users' actions to other users is one of the cornerstones of any cloud based document storage and sharing service. It enables people to be on the top of the content made available (and editable), and take action (edit a document) in case that is expected from them.

These kind of notifications are delivered to the users in various ways; e-mails, integrated in-app messages embedded in various social media services, SMS messages and often also as core functionality embedded into some client/web-front end the users use to access a document-centric solution or an online service.

When bringing the above described aspects of prior art solutions into a practice, it is also necessary to describe a typical document editing process in a collaborative environment. Usually it goes as described in the following steps:

(i) Content creation, such as document editing, may start from desktop of computing device, using typical word processing applications available in the desktop environment. In this approach, a person (the initial editor) first creates a document using desktop word processing application, and then decides to make the document available for others to view and edit, e.g. shares it. In some cases, the initial document creation happens automatically by some document automation solution which generates the document by combining dynamic data content with pre-existing document template. Also, in some cases, the document creation happens entirely online, using some online editing solution instead of first creating the initial version of the document using desktop word processing application.

(ii) The initial editor or in some cases the document automation solution uploads the document file into cloud.

(iii) The initial editor may first edit the document using some online editing solution (either real-time co-edit, or turn-based).

(iv) After making sure (optionally) that the document, now stored in the cloud service, is ready to be shared with others, the initial editor shares the document by in-prompt defining to whom it should be shared, and with what kind of rights (view or comment only, perhaps edit too). It is also possible that the sharing happens based on initial creator's user profile, membership to certain user groups, organization or some other pre-defined detail which is defines the sharing scope.

(v) Depending on the online service where the document file was uploaded and subsequently shared, possible collaborators (either defined by the person who uploaded the initial version of the document, or perhaps a pre-defined group of people based on initial creator's user profile, may get notifications if somebody opens a document to view it, comments it or edits a document.

(vi) These notifications are (automatically) sent to the users "subscribing to that document", and are in a form of "somebody did something to document X and thereby you should be aware of it".

(vii) Quite typically the default mean to send the notifications is via email; some applications also support sending such notification messages into $3^{rd}$ party service, within which they appear as private messages from external application/service, targeted to a certain predefined collaborator.

(viii) At some point of time now cloud-based document may be exported back to a format which allows editing and/or viewing on desktop. Once such export function is initiated, it concludes to file download into a local system.

The prior art solutions have drawbacks. In some prior art solutions user needs to manually go through the document in order to find out what another user has edited in the document even if the user was informed, i.e. notified, that an edit was done to the document. Alternatively or in addition, the information in the notifications is typically very unsubtle and the notifications may also be delivered to persons to whom the information in the notification has no relevance. This kind of prior art approaches causes unnecessary disturbance to users being involved in the collaborative working environment as well as consumes unnecessarily time from users due to excessive information delivery lacking relevant details among other negative effects.

Hence, there is need for improvement with respect to the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a computer-implemented method, a system and a processor-readable non-transitory medium for generating a notification in a collaborative document editing environment. Another objective of the invention is that the computer-implemented method, the system and the processor-readable non-transitory medium optimizes an amount of notifications to be generated for parties.

The objectives of the invention are reached by a computer-implemented method, a system and a processor-readable non-transitory medium for generating a notification in a collaborative document editing environment.

According to a first aspect, a computer-implemented method for generating a notification relating to editing of a document in a collaborative document editing environment is provided, the method comprising: establishing the collaborative document editing environment at least by defining a plurality of users permitted to access the document in the collaborative document editing environment, wherein at least one user among the plurality of users is granted a right to edit the document; monitoring if the document is edited by the at least one user granted the right to edit the document; in response to a detection that the document is edited by the at least one user granted the right to edit the document generating at least one notification representing at least one edit event performed by the at least one user granted the right to edit the document; and transmitting the at least one notification representing the at least one edit event performed by the at least one user granted the right to edit the document to at least one recipient.

The step of monitoring if the document is edited by the at least one user granted the right to edit the document may comprise an identification of an edit event performed to the document. Alternatively or in addition, the step of monitoring if the document is edited by the at least one user granted the right to edit the document may comprise storing of information on the edit event in a memory in a document-specific manner. Further, the step of monitoring if the document is edited by the at least one user granted the right to edit the document may comprise storing of information representing time when the edit event is performed to the document.

The step of generating the at least one notification may comprise a retrieval of information on at least one edit event performed to the document from a memory.

Moreover, the step of generating the at least one notification may comprise obtaining information on at least one filtering scheme from a memory. The step of generating the at least one notification may comprise a filtering of the information on the at least one edit event performed to the document according to the at least one filtering scheme.

The step of generating the at least one notification may comprise syndicating a plurality of edit events in the at least one notification. The syndication may be performed by generating information of the notification message so that it concludes the information of the plurality of the edit events in a distilled manner.

The step of generating of the at least one notification may comprise formatting a message comprising information on the at least one edit event through an application programming interface for at least one communication application.

The transmission of the at least one notification, in turn, may be performed according to a time scheme defined in at least one filtering scheme stored in a memory.

The at least one notification may be transmitted to at least one user according to information stored in a user profile of the at least one user.

The recipient of the at least one notification may be at least one of the following: at least one user granted an access the collaborative document editing environment, a third party external to the at least one user granted the access the collaborative document editing environment wherein the contact address of the third party is defined in a memory, a third party external to the at least one user granted the access the collaborative document editing environment wherein the contact address of the third party is associated to the document under edit.

According to a second aspect, a system for generating a notification relating to editing of a document in a collaborative document editing environment is provided, the system comprising: at least one processor; and at least one memory including computer program code; the at least one memory and the computer program code configured to, with the at least one processor, cause the system at least to perform: establish the collaborative document editing environment at least by defining a plurality of users permitted to access the document in the collaborative document editing environment, wherein at least one user among the plurality of users is granted a right to edit the document; monitor if the document is edited by the at least one user granted the right to edit the document; generate at least one notification representing at least one edit event performed by the at least one user granted the right to edit the document in response to a detection that the document is edited by the at least one user granted the right to edit the document; and transmit the at least one notification representing the at least one edit event performed by the at least one user granted the right to edit the document to at least one recipient.

The system may be configured to, in the step of monitoring if the document is edited by the at least one user granted the right to edit the document, identify of an edit event performed to the document. Alternatively or in addition, the system may be configured to, in the step of monitoring if the document is edited by the at least one user granted the right to edit the document, store information on the edit event in a memory in a document-specific manner. Further, the system may be configured to, in the step of monitoring if the document is edited by the at least one user granted the right to edit the document, store information representing time when the edit event is performed to the document.

The system may be configured to, in the step of generating the at least one notification, retrieve information on at least one edit event performed to the document from a memory. Further, the system may be configured to, in the step of generating the at least one notification, obtain information on at least one filtering scheme from a memory. The system may also be configured to, in the step of generating the at least one notification, filter of the information on the at least one edit event performed to the document according to the at least one filtering scheme.

The system may be configured to, in the step of generating the at least one notification, syndicate a plurality of edit events in the at least one notification. The system may be configured to perform the syndication by generating information of the notification so that it concludes the information of the plurality of edit events in a distilled manner.

Moreover, the system may be configured to, in the step of generating of the at least one notification, format a message comprising information on the at least one edit event through an application programming interface for at least one communication application.

The system may be configured to perform the transmission of the at least one notification according to a time scheme defined in at least one filtering scheme stored in a memory.

The system may be configured to transmit the at least one notification to at least one user according to information stored in a user profile of the at least one user.

The system may also be configured to select the recipient of the at least one notification from at least one of the following: at least one user granted an access the collaborative document editing environment, a third party external to the at least one user granted the access the collaborative document editing environment wherein the contact address of the third party is defined in a memory, a third party external to the at least one user granted the access the collaborative document editing environment wherein the contact address of the third party is associated to the document under edit.

The system may be implemented with one of the following: a standalone server, a server network comprising a plurality of servers.

According to a third aspect, a processor-readable non-transitory medium storing processor-executable instructions is provided for generating a notification relating to editing of a document in a collaborative document editing environment according to a method as defined above.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 schematically illustrates a collaborative document editing environment in which the present invention may be implemented to.

FIG. 2 schematically illustrates an example of user profile to be applied in the context of the present invention.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figures 1, 2:
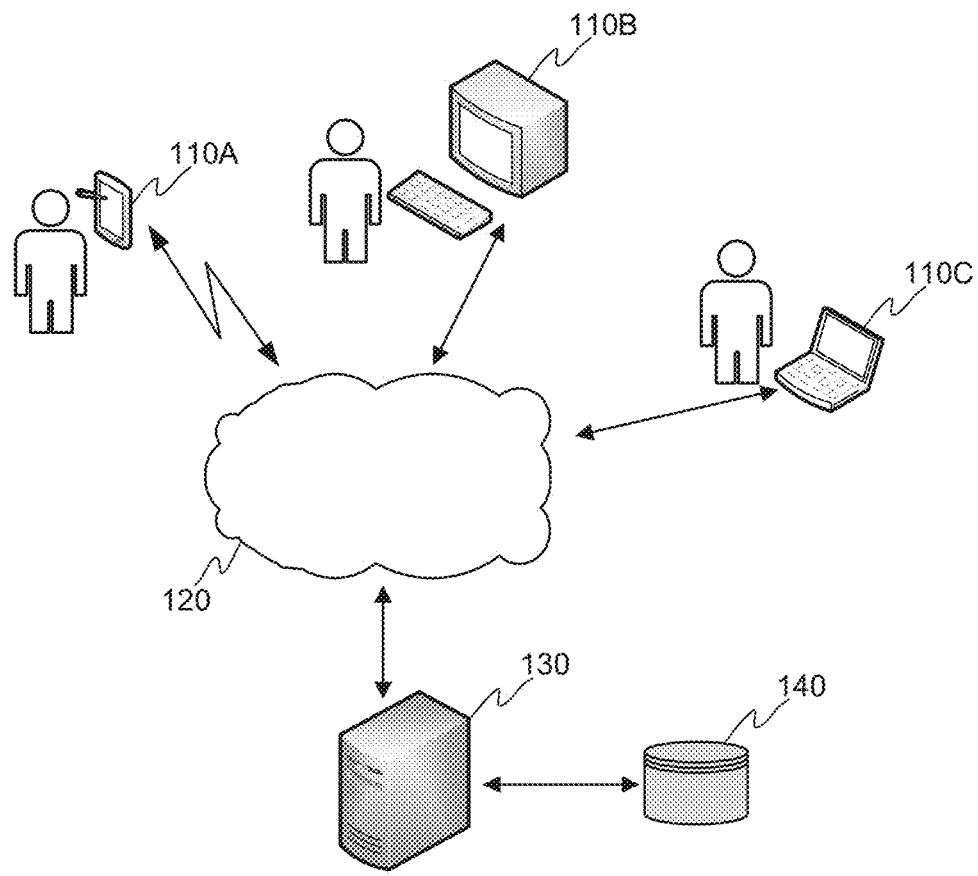

According to the present invention one aim is to enable implementing a collaborative document editing solution in such a way which will improve awareness of other users about the edits made to a content of a document by a certain user. FIG. 1 schematically illustrates a non-limiting example of a communication environment into which a collaborative document editing environment according to the present invention may be implemented. The implementation of the solution according to the present invention may be arranged by using one or many communication networks together forming the communication environment. As said the communication environment depicted in FIG. 1 is only an example and alternative environments may exist. The present invention is especially advantageous in an online collaborative document editing environment.

In the exemplary collaborative document editing environment of FIG. 1 a plurality of users may access to the communication environment, and thus to a collaborative document editing environment as will be discussed, with their terminal devices 110A, 110B, 110C. The terminal devices may e.g. be mobile terminals 110A, personal computers 110B or laptop computers 110C or any similar by means of which it is possible to access, and participate, to the collaborative document editing environment. The access to the collaborative document editing environment may be performed over a communication network 120, or over a plurality of communication networks implementing different network technologies. Moreover, the communication of the terminal devices 110A-110C may be implemented in a wired or wireless manner.

The collaborative document editing environment, as schematically depicted in FIG. 1, comprises at least one server 130 which is configured to execute a collaborative document editing environment at least in part. The server 130 may access to one or more databases 140, or data storages, which may be configured to store one or more documents available for collaborative use. In other words, the server 130 may be configured to obtain, e.g. in response to a received user instruction given with a terminal device 110A-110O, a document from a database 140 and establish a collaborative document editing environment by initiating an editing function in the server 130. The editing function refers to a specific process, e.g. implemented in a form of a computer application, which is executed in the server 130 into which one or more of the terminal devices 110A-110C may access for providing means in order to edit the document in question. The terminal device 110A-110C may also execute an editing function, which is configured to cooperate with the server 130 as will be described. An example of the editing function executed in the terminal device 110A-110C is an Internet browser, wherein a JavaScript is executed for exchanging data with a service executed in the server 130.

In the following a non-limiting example of the editing function executed in the server 130 in question is described. It is assumed that the document stored and obtained from the database 140 for editing is in a form of some commonly used document formats, such as created with some known document creation programs. The editing function executed in the server 130 may be configured to obtain the document, and to read and parse the document and its content, and to generate an intermediate representation of the parsed data. Further, the editing function may be configured to determine document, cf. page and/or object layouts, and paginate the content. Finally, the editing function may be configured to generate a final output format which is provided for editing purposes in the server 130, and thereby made accessible to editor applications running on terminal devices 110A, 110B and 110C. The final editable output format may e.g. be a HTML presentation of the original document. The manipulation of the original document into the final output format for editing enables, among other things, utilization of modern HTML centric browser tools when the final output format for is HTML. When the original document is brought to HTML format though an intermediate format as described, no information belonging to the original document is lost even in cases when the HTML representation of the original document cannot properly display all the data originally included in the document. Furthermore, bringing the document into the HTML format for transmission purposes, and subsequently parsing that HTML format into Document Object Model (DOM) presentation, increases a granularity and modifiability of the document data, in comparison to the original document format which has been primarily designed for enabling compact storage and transmission of the document data. Ability to track changes happening with Document Object Model (DOM) helps in accurately syncing of changes done by the users simultaneously working with the document in question. Hence, it is possible to keep track on changes done to the document in a document data object level. Worthwhile to mention already at this stage is that it is possible to return the document back in the original storage and transmission format, i.e. from Document Object Model representation into HTML format, and then back to the original document storage and transmission format through the intermediate format.

For describing the present invention further it is assumed that the original document is brought to the HTML format and, thus, when the HTML file is parsed into Document Object Model (DOM), the editing function provides access for the users to manipulate the document data stored into Document Object Model (DOM) using editor applications running on the terminal devices 110A-110C. Further, the server 130 may be configured to maintain user profiles of the users allowed to access the one or more documents being accessible through the server 130. FIG. 2 schematically illustrates an example of user profile for user NN, which may be maintained in the server 130, or in any network entity into which the server 130 may be configured to have an access. The exemplary user profile may comprise data records for user ID (xyz) and a password (pwd123) for the user ID. The user ID and the password are advantageously provided to the user NN prior to when he/she intends to access the server for editing a document in question. The user profile may also comprise a data record indicating one or more contact details, such as email address or similar, to the user. Further, according to one embodiment of the invention the user profile may comprise one or parameters by means of which the user rights may be defined on a user basis. For example, the user profile may comprise a parameter in a form of a data record indicating, or defining, documents into which the user in question has right to access. Moreover, another parameter may define rights for the user to edit the document(s) into which the user has access. For example, the user may be provided full edit rights, partial edit rights, such as commenting, or only right to view on the document and edits made to the document. The level of access rights may be defined in a plurality of ways. According to the embodiment, the access rights may be defined on a user based, e.g. user in question may edit all the documents into which he/she has access in the manner as defined in the document right parameter. According to some embodiment the user profile may also store information on user groups the user in question belongs to. Naturally, it is possible to set a default value for access right if seen necessary.

According to another advantageous embodiment of the present invention it is possible to define the document rights on a document based manner i.e. for each document it is separately defined right or rights which may define, at least, the users who may access the document. Additionally, the document right may comprise information which defines the access rights for each user with respect to a certain document. As mentioned the access right may define that the user may edit the document, comment it or only view the document. This kind of document access information may be associated to a document with e.g. a separate data record or included in the document, e.g. by storing it in a meta data of the document in question, which may be accessed for defining access right of a certain user. In this kind of implementation the user profile(s) are relevant for accessing the service in general and for storing e.g. contact details for the user(s).

Figure 3:
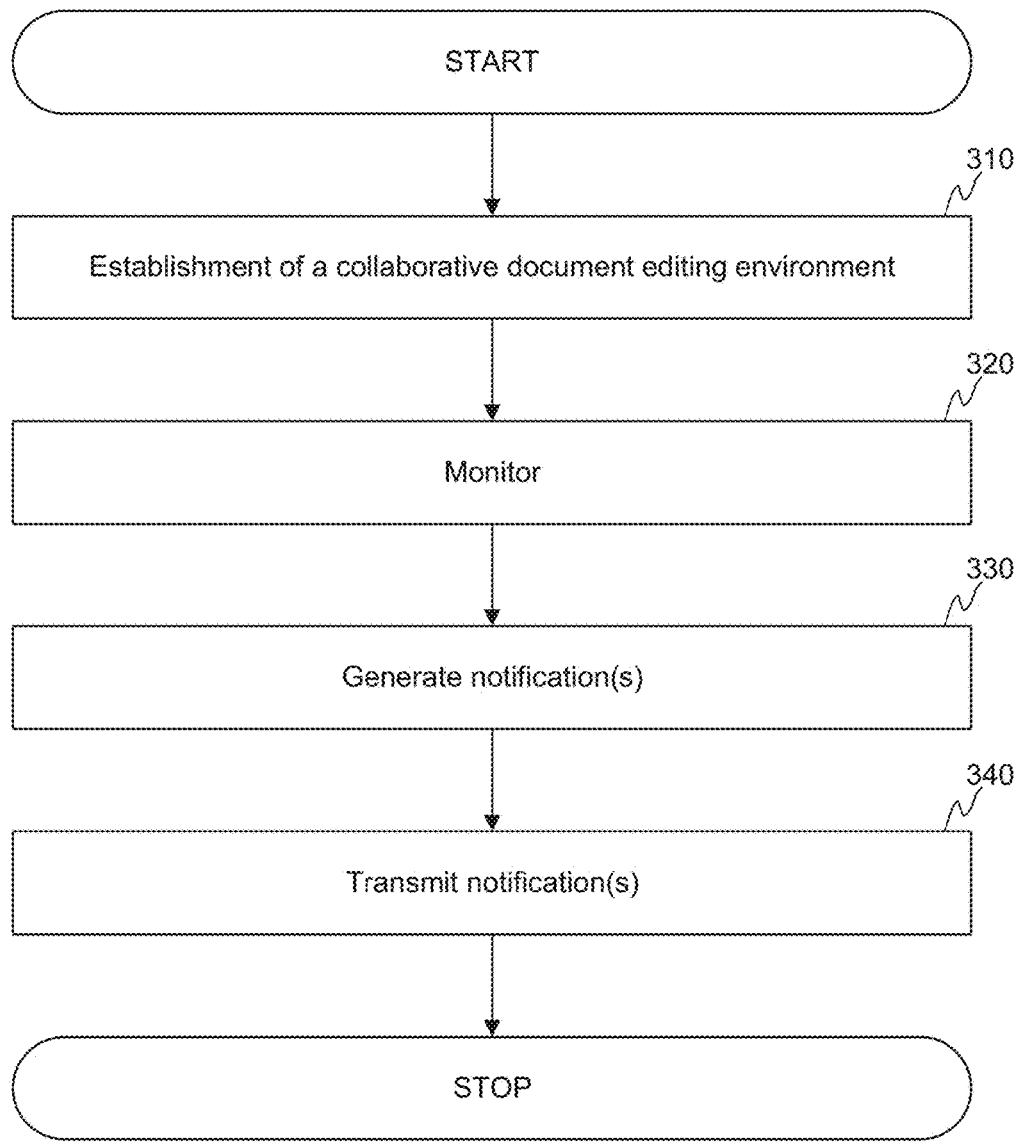
FIG. 3 schematically illustrates a computer-implemented method for editing a document in a collaborative document editing environment according to an embodiment of the present invention.

Next at least some aspects relating to the present invention according to an embodiment is described by referring to FIG. 3. FIG. 3 schematically illustrates a computer-implemented method for editing a document in a collaborative document editing environment according to an embodiment of the present invention.

Regarding step 310:

First, the collaborative document editing environment is established 310 at least by defining a plurality of users permitted to edit a new or pre-existing document in the collaborative document editing environment. The definition of the plurality of users permitted to edit the document may be performed prior to a user requests access to the document in order to edit it. Alternatively, defining user's ability to access a certain document may be performed in real-time. The real-time definition may e.g. be performed so that a user requests an access to a certain document by submitting an applicable request to access a certain document using his/her terminal device 110A-110C towards the server 130 in FIG. 1. The server 130 receives the request and may perform some predetermined operations, such as prompting user credentials to be input by the user requesting the access. The input user credentials may be compared to the information stored in a user profile or in a metadata of a document the user requests to access. In response to detection that the input user credential information is correct the access to the document for the user may be granted. In some implementation of the present invention the user credentials are requested at the first time when accessing the document and in response to a granted access to the document a cookie i.e. a small piece of data is transmitted from the server 130 to the terminal device of the user, which cookie enables any future authentication, i.e. accessing the document, without any input of user credentials. Any other access solutions may be implemented in the context of the present invention.

As a result of the step 310 there may be defined a document, which is the document under editing in the collaborative document editing environment into which an access for certain users is defined.

Figures 4, 5:
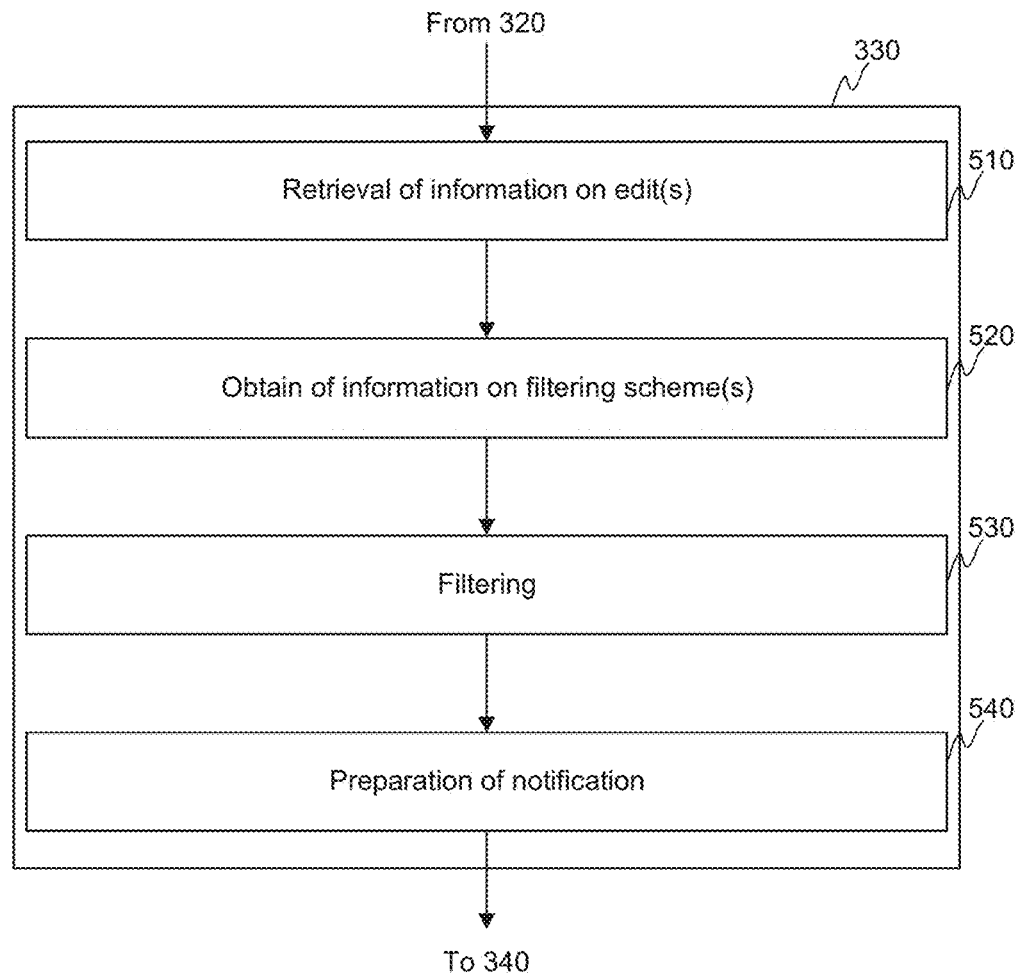
FIG. 4 schematically illustrates an example of a data structure into which the edit events made into a document may be stored.
FIG. 5 schematically illustrates some further aspects of a method according to an embodiment of the present invention.

Regarding step 320:

Now, the document may be downloaded into terminal devices 110A-110O. Prior to offering the document for downloading it may be converted from its original format to some applicable format for editor application residing in the terminal devices 110A-110O. For example, the original document format may be some commonly known word processing format, which is converted with known tools to a HTML format prior terminal devices 110A-110O can download it. To start editing a document, a user may instruct his/her terminal device 110A-110C to initiate a download of the document in the format, such as in the HTML, it is stored in the server 130. The editor application executed in the terminal device 110A-110C receives the document and is configured to parse the document into a Document Object Model (DOM). The parsing may e.g. be performed in the terminal device with a web browser or other similar application, for example, which may be stored in the memory of the terminal device 110A-110C While the document is stored in the Document Object Model (DOM), the document data is accessible by the user of the terminal device to whom the access is granted as described in the context of the step 310 for editing purposes. At the same time there may be one or many terminal devices connected in the collaborative document editing environment, each of which has initially gotten the most recent HTML representation from the server 130. Document Object Models (DOM) stored in different terminal devices 110A-110C are kept in sync by transmitting changes done by users to the server 130, and then server 130 distributes changes to other connected terminal devices 110A-110O. The transmission of changes done by a user to the DOM of the document may e.g. be triggered automatically, or manually in response to a pre-defined user action, by the editing application, such as a JavaScript application running in the browser. Hence, the editing functions carried out in various terminal devices 110A-110O cause modifications to terminal device specific Document Object Models, and these changes get propagated for syncing purposes to the server 130 which hosts master Document Object Model, which may be considered as the most up-to-date version of the document under edit. The server 130 may be configured to monitor 320 if the master Document Object Model, or any part of it, changes, e.g. the document is edited by at least one of the users permitted to edit the document. The granular monitoring 320 is advantageously arranged so that a monitoring procedure identifies certain editing operations performed by one or more users propagated to the master Document Object Model at server 130, now representing the most recent version of the document data. Such monitoring 320 functionality may now capture and store these changes in memory in such a format that those structures correspond to the format in which the original document is brought to. In order to enable versioning and tracking modifications done by different users, it also store identifiers representing the edit turns or sessions, as well as authors, i.e. the users, behind those modifications. The memory used for storing this information may e.g. reside in the server 130. FIG. 4 illustrates schematically an example of data structure into which the edit events made into a document may be stored. For example, the edit events may advantageously be collected in a document-specific manner, i.e. the data structure is maintained in the memory for each document being available for collaborative editing purposes. According to the exemplary embodiment of FIG. 4 the data structure comprises information on a user (NN, KK, MM) who has made the edit event in question, time stamp (t1, t2, t3, t4) indicating information on an occasion of the edit event and a description of the edit event. For sake of clarity it is worthwhile to mention that the time stamp does not necessarily directly indicate an instant of time when a specific edit event is made. Namely, in some implementation of the present invention it may be enough to be aware on the order of edit events made to the document and the information on the order provides enough information for the further steps, as will be described. As mentioned the data structure as schematically illustrated in FIG. 4 is a non-limiting example and it may vary according to the need and/or data model in use. For example, in the context of Document Object Model the data structure is a tree-like wherein branches of the tree are called nodes. The results of the edit events to the document may advantageously be stored in the nodes for further use. As said, the data structures may vary within the area of the present invention.

The description of the edit operation made to the document is advantageously such that it provides information on the edit at a desired level. According to the example of FIG. 4 the description of the edit provides information by means of which it is possible to derive detailed information what kind of edit event is made to the document, what is the affected location of the edit operation with the document and what is the resulting value of the affected location produced as a result of the edit operation. For example, at an instant of time t3 the user MM edited a field R in the document by replacing a text "qwerty" with a text "yuiop". In the described manner the monitoring function may collect all the edit event operations made to the document in the data structure.

Regarding step 330:

The method according to the present invention comprises a step of generating at least one notification 330 representing at least one edit event performed by the at least one of the plurality of the users permitted to edit the document. The generation of the notification may be performed in response to detection that the document was edited by at least one of the plurality of the users permitted to edit the document. More specifically, the representation of the at least one edit event refers to data in the notification from which information on the edit event is derivable. For example, the information on the edit event may e.g. be the edit description as shown in FIG. 4, or any code or parameter representing the edit event, or a plurality of edit events, in question. According to some embodiment of the present invention the possible edit events which may be performed to the document are classified in a predetermined manner and the data representing the edit event comprises at least one piece of information indicating the class into which the edit event is classified. For example, if textual content of the document is changed, the edit event is classified in a first class, but if a template of the document is changed, the edit event is classified in a second class, and so on. In this manner it is possible to compose structured information on the edit events as needed.

In the context of the data structure of FIG. 4 the generated notification message regarding the edit event made at the instant of time t2 may e.g. be the following:
"Document XX:KK edited field R by adding a text "qwerty"."

Hence, the generation function may utilize some pre-determined notification structures into which the generation function is configured to add information based on the created data structure, as shown as an example in FIG. 4. In some embodiment of the present invention the notification message may be generated so that it carries information on a plurality of edit events made in the document at the same time in order to optimize an amount of notifications to be generated and transmitted to one or more recipients. This kind of syndication aspect will be discussed in more detail later in the description.

The generation function for generating the at least one notification 330 may also be configured to perform pre-determined operations to the edit events inserted in the data structure comprising the edit events made to the document. The pre-determined operations may e.g. refer to filtering of information collected in the data structure, or similar. For example, the following filtering schemes may be established either alone or in combination (the list is not necessarily exhaustive):

Filtering the edit events records based on a type of edit event
Location, for example "which page", "what section" etc.
Filtering the edit event records based on an amount of edit events
Filtering the edit event records based on time information
Filtering the edit event records based on editor(s) (user(s))
Filtering the edit event records based on user profile of recipient(s)

If the filtering of edit event records inserted in the data structure is based on a type of edit event, it may be arranged so that the server 130, or the entity performing the generation of the notification, is configured to detect the type of edit event the user has made to the document and based on that to determine if information on the edit event is to be included in the notification message. In other words, the server 130 may maintain at least one criterion by means of which the determination on the filtering may be done.

Alternatively or in addition, the filtering of edit events may be based on an amount of edit events. This may refer to a number of edit events made to the document or an amount of changes with respect to total amount of information in the document, or in a certain field in it. For example, if it is above a predefined threshold, such as 50%, information on that shall be included in the notification, otherwise it is filtered out. This kind on implementation may be arranged so that predetermined rules, e.g. on a field and document basis, are defined in the memory of the server 130, and the amount of changes is measured and represented with an applicable parameter and compared to the stored rules, and filtering is performed accordingly.

According to still further embodiment the filtering may be arranged on a time basis. This may refer to a utilization of the time stamp information in the data structure or it may be arranged that notifications are generated, and transmitted, according to some predetermined time scheme, e.g. in every half an hour, after a certain time from the last edit event of a certain user, or immediately when the edit event is made. In a sophisticated solution the time scheme for generating and transmitting the notifications may be adjusted. According to an embodiment of the present invention the time scheme may be adjusted according to a number of users editing a certain document at the same time. The implementation based on filtering in a time based manner may be done so that predetermined rules, e.g. a number of edit events within a predetermined period of time or any similar, are defined in the memory of the server 130, and when the number of edit events exceeds the limit, notification is generated. Until that no notifications are generated.

Moreover, the time aspect may also be combined with the filtering scheme in which the amount of edit events is taken into account. With this kind of arrangement it is possible to determine an activity around a certain document or a plurality of documents for e.g. determining an order of the notifications to be sent. Namely, in some situation it is important to get notifications primarily relating to a document which is under major modifications over some other document, which is not modified that much.

Alternatively or in addition, the filtering may be based on user(s). For example, the filtering may be arranged so that information on the edit events is included to the notification only if the edit events are made by a certain user. This is advantageous especially in a situation when different users have different viewing, commenting or editing rights to the document. In such a situation the generation of the notifications may be arranged in sophisticated way by optimizing the information to be delivered to the recipients. Moreover, it may be arranged so that information on the edit events made by a certain user may be included in the notification, or transmitted, to the recipients under different notification transmit scheme than some other user(s).

Further, the filtering may also be based on user profiles stored in a memory accessible by the server 130 implementing the notification generation function. Namely, it may be arranged that the notification generation function obtains information on at least one recipient of the notification by accessing a user profile of the at least one recipient. Based on the information stored in the user profile the server 130 may perform filtering of the generated notifications on a user basis. For example, a certain user may have set that he/she is not willing to receive information on certain type of edit events. Hence, if the document is edited with such types of edit events, for the user in question no notification is generated. Moreover, according to some embodiment of the invention the users may be categorized into different groups and for each group it is given definitions on the types of edit events on which the notification shall be generated. Hence, the filtering of notifications may be performed on the group basis.

The above described filtering schemes are examples and further schemes may be established. Moreover, the present solution may be implemented so that a plurality of the schemes are combined and in such a manner it is possible to establish sophisticated filtering schemes by means of which it is possible to optimize both the generation of the notifications and also transmitting them to recipients. This helps in optimizing the necessary computing resources and network resources as well as avoid sending too many and too frequent notifications to the users, and by doing so cause them unnecessary information overflow.

As becomes clear from the above the filtering may have effect either in the generation of the notifications or in the transmitting them further.

Regarding step 340:

Finally, in step 340 the at least one generated notification representing the at least one edit event performed by the at least one of the plurality of the users is transmitted to at least one of the plurality of users permitted receive the notification. Typically, the recipients may be defined among the ones who are permitted to access, i.e. viewing, commenting and/or editing, the document and thus the document editing environment, and especially those who are permitted to edit the document in question. However, according to some further embodiment at least some of the recipients of the notifications may be a third party external to the at least one user granted the access the collaborative document editing environment wherein the contact address of the third party is defined in a memory of the server, for example. Moreover, the recipient may be, in some implementation of the invention, a third party external to the at least one user granted the access the collaborative document editing environment wherein the contact address of the third party may be associated with the document under edit in some known manner, or it may be included to a meta data of the document under edit. The association of the contact address of the third party may e.g. be implemented with a data record distinct to the document, into which data record the document addresses in order to capture the contact address or addresses of a third party or third parties. Hence, the transmit of the notification may be implemented so that the notification transmit function obtains a user list, and at least the contact address of the users, from a predetermined location with respect to the document being edited, and transmits the generated message taking into account filtering schemes, if any, to the contact addresses i.e. desired recipients.

Naturally, in some implementation the transmit step may perform only the delivery of the notification to the users and the determination of the recipients, i.e. the users, and any filtering is performed in the previous step, i.e. in the generation step 330.

Regarding the steps 330 and 340 of FIG. 3 it is necessary to understand that the computer implemented solution according to the present invention may be implemented so that it is configured to generate and transmit the at least one notification over a standardized application programming interface (API) by means of which it is to achieve different computer implemented functions, such as computer executed application to exchange information. In regards to the present invention the editing function generates the notification over an API, which is then transmitted to a recipient with another application, such as a chat function or an email function. Alternatively or in addition, the generation step may be configured to generate the notification in an application-specific format, which then may be transmitted to the application in question, or to a server implementing the application.

For introducing the generation step 330 in more detail we refer to FIG. 5, which depicts some aspects of the generation step according to an embodiment of the invention. The generation step may comprise the following sub steps: retrieval of information on edit(s) 510, obtain of information on filtering scheme(s) 520, filtering 530 and preparation of notification 540. The retrieval of information on the edits 510 relates to a procedure in which a processing unit is configured to retrieve information from a memory on the one or more edits, which are done to the document in question. This may be configured to be performed in response to an indication from the monitoring procedure, which is configured to monitor if edit events are done to the document. Alternatively or in addition, the retrieval of information on the edits 510 may be configured to be performed according to a predetermined time scheme, regularly or irregularly for example. In the computing environment the retrieval of information may be performed by performing a predetermined query to the memory, which responses with the requested information. Now, as the processing unit has received the information on the edits from the memory it may be configured to obtain information on filtering schemes, if any, set for the document and/or for users accessing the document. The obtaining, or retrieval, of information on the filtering schemes may be performed by querying information on the filtering schemes, i.e. rules, from a memory storing those and the processing unit receives, as the response, the filtering schemes. The retrieval of the filtering schemes in the manner as schematically disclosed in FIG. 5 is advantageous for the reason that if any updates to the filtering schemes is made e.g. during the editing of the document those will be taken into account immediately and the generation of the at least one notification may be performed with up-to-date information. Next, the filtering 530 is performed. In the filtering 530 the retrieved pieces of information representing the edits done to the document are filtered according to the filtering schemes obtained from the memory. As described the filtering may be performed for the all users of the document in the same manner or individually, or a group based, for a sub-group of users. If an individual filtering is performed then the filtering schemes are advantageously defined in an individual manner, e.g. from any filtering rule defined in user profiles. When the processing unit, i.e. the processing function, has performed the filtering 530 the notification, or notifications, are prepared 540, which is discussed in the following.

According to an embodiment of the invention the preparation of the at least one notification 540 may comprise an operation called a syndication of edit events obtained as the outcome of the filtering 530. This refers to an arrangement in which information on a plurality of edit events are syndicated, i.e. combined or summarized, into one notification in order to optimize a number of notifications to be transmitted. There may be established rules for the syndication. For example, there may be defined that similar edit events, which has passed the filtering, may be syndicated and the information on the syndicated edit events is generated. The rules may vary according to the need. The information to be included in the notification through the syndication may e.g. depend on the edit events on which the information is to be concluded. In one advantageous embodiment of the present invention the syndication is performed by generating the information of the notification message so that it concludes the information of the edit events in a distilled manner in order to provide the recipient an optimal amount of information, which still fulfills the need. In another words, the generation may comprise, but is not limited to, modification of the content of the notification for indicating that it comprises information on the plurality of edit events, including details being common to the edit events on which the information is to be included in the notification, and so on in order to gain the distilled representation of the information. Furthermore, the preparation of notifications may also e.g. refer to a utilization of APIs, as described, for generating the notification so that it may be transmitted through a communication application in question to the user. According to the invention it may be arranged that the same notification may be delivered through a plurality of systems, i.e. through a plurality of APIs. When the at least one notification is prepared and the generation step is finalized the notification is transmitted in step 340. As mentioned, some the preparation operations may be performed in the context of the transmission of the notification. The same may apply to the filtering, especially in the context to whom a certain notification is to be transmitted.

According to some other embodiment of the present invention the syndication of edit events may be performed on a user basis. This refers to an implementation in which users may be defined in groups, wherein it is defined as a group basis how the syndication of edit events shall be performed. The groups may comprise one or more users allocated there e.g. on the basis of information stored in the user profile, for example. In some implementation of the present invention the user may manages rules in the user profile how the syndication shall be performed for him/her. The same may also apply to filtering scheme i.e. it may be arranged that the filtering scheme is also defined on a user or user group basis. The definitions according to the examples above may be implemented by programming a device, or a computer-implemented function, to operate accordingly.

Figure 6:
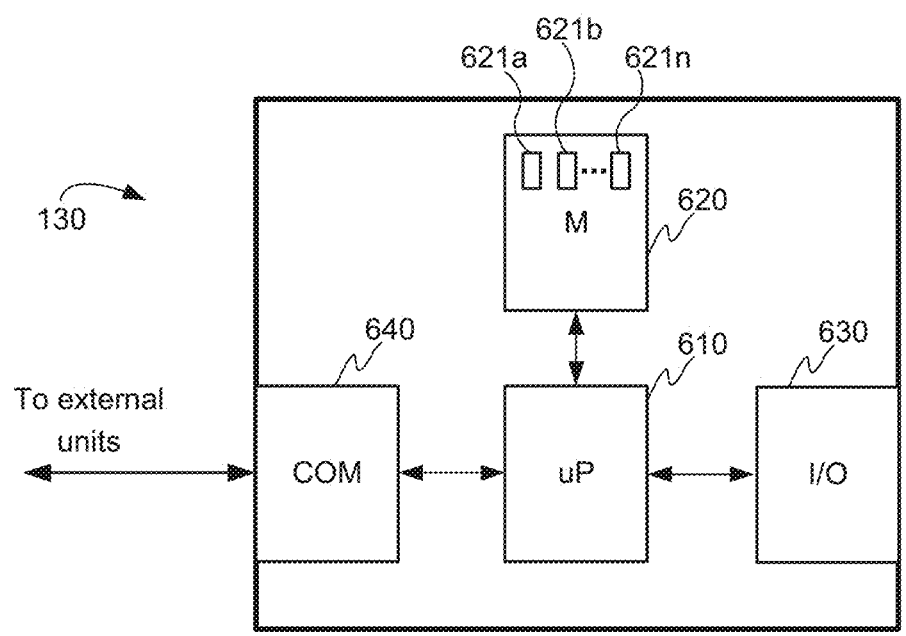
FIG. 6 schematically illustrates an example of a server which may implement at least some steps of the method according to an embodiment of the present invention.

FIG. 6 illustrates schematically an example of a server 130, as a system, which is configured to execute a set of instructions that may cause the server 130 to perform one or more of the method steps and procedures described above. The server 130 may include at least one processor 610, such as a central processing unit (CPU), and a memory 620. The memory stores portions of computer program code 621a-621n, which define the set of instructions for controlling at least in part the operation of the server 130. The server 130 may further include I/O means and devices 630, such as a display unit, a keyboard, a cursor control device, a signal generation device, such as a speaker or remote control, and at least one communication interface device 640, such as a modem, in order to communication with external entities, such as with terminal devices 110A-110C either directly or indirectly. The mentioned entities within the server 130 may be arranged to communicate with each other through a bus.

In some embodiments of the present invention the system may implemented in a single server 130, which is communicatively coupled to the terminal devices 110A-110C either directly or indirectly through a communication network. In some other embodiment of the present invention the system may be implemented in a decentralized manner in which a plurality of server devices are configured to perform the method as described in a cooperative manner. For example, the system as decentralized servers may be configured to perform pre-determined tasks, and at least one server is configured to operate as a master device controlling and managing the whole operation. The decentralized implementation may refer to so called cloud computing solution wherein so called virtual servers may be configured to implement at least a part of the present method. The decentralized implementation may refer to, but is not limited to, so called micro architecture implementation. As mentioned in the decentralized implementation tasks and/or functions are divided between a plurality of physical servers or virtual servers, which may be configured to operate together, e.g. through agreed application programming interface(s), for generating the service they are configured to implement.

At least some aspects of the present invention may relate to a processor-readable non-transitory storage medium on which is stored one or more sets of processor executable instructions (e.g. in a form of portions of computer program code) configured to implement one or more of steps of the method as described herein. The instructions may also reside, completely or in part, within a main memory, the static memory, and/or within the processor during execution thereof by the at least one server 130. The term computer-readable medium shall also cover, but is not limited to, solid-state memories such as a memory card or other package that houses one or more read-only (nonvolatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

In the description herein it is mainly referred that the document is parsed to Document Object Model (DOM) for editing purposes. The Document Object Model shall be understood to be an example of the detailed structural representation of the data of a certain document, which is applicable in the context of the present invention. However, the inventive idea of the present invention is not limited to the Document Object Model only, but any model by means of which it is possible to differentiate and store parts and/or elements of the document in the memory may be applied.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A computer-implemented method for generating a notification relating to editing of a document in a collaborative document editing environment, the method comprising:
   establishing the collaborative document editing environment at least by defining a plurality of users permitted to access the document in the collaborative document editing environment, where at least one user among the plurality of users is granted a right to edit the document;
   monitoring if the document is edited by the at least one user granted the right to edit the document;
   in response to a detection that the document is edited by the at least one user granted the right to edit the document, generating at least one notification, said at least one notification syndicating a plurality of edit events of the collaborative document editing environment performed by the at least one user granted the right to edit the document; and
   transmitting the at least one notification representing the syndication of said plurality of edit events to at least one recipient.

2. The computer-implemented method according to claim 1, wherein said monitoring if the document is edited by the at least one user granted the right to edit the document includes an identification of an edit event performed to the document.

3. The computer-implemented method of claim 1, wherein said monitoring if the document is edited by the at least one user granted the right to edit the document includes storing of information on an edit event in a memory in a document-specific manner.

4. The computer-implemented method of claim 1, wherein said monitoring if the document is edited by the at least one user granted the right to edit the document includes storing of information representing time when an edit event is performed to the document.

5. The computer-implemented method of claim 1, wherein said generating of the at least one notification includes a retrieval of information on at least one edit event performed to the document from a memory.

6. The computer-implemented method of claim 5, wherein said generating of the at least one notification includes obtaining information on at least one filtering scheme from a memory.

7. The computer-implemented method of claim 1, wherein said generating of the at least one notification includes filtering of the information on the plurality of edit events performed to the document according to the at least one filtering scheme.

8. The computer-implemented method of claim 1, wherein said syndication is performed by generating information of the notification message so that it concludes the information of the plurality of edit events in a distilled manner.

9. The computer-implemented method of claim 1, wherein said generating of the at least one notification includes formatting a message comprising information on at least one edit event of the plurality of edit events through an application programming interface for at least one communication application.

10. The computer-implemented method of claim 1, wherein said transmission of the at least one notification is performed according to a time scheme defined in at least one filtering scheme stored in a memory.

11. The computer-implemented method of claim 1, wherein the at least one notification is transmitted to at least one user according to information stored in a user profile of the at least one user.

12. The computer-implemented method of claim 1, wherein the recipient of the at least one notification is at least one of the following: at least one user granted an access the collaborative document editing environment, a third party external to the at least one user granted the access the collaborative document editing environment wherein the contact address of the third party is defined in a memory, a third party external to the at least one user granted the access the collaborative document editing environment wherein the contact address of the third party is associated to the document under edit.

13. A system for generating a notification relating to editing of a document in a collaborative document editing environment, the system comprising:
at least one processor; and
at least one memory including computer program code;
the at least one memory and the computer program code configured to, with the at least one processor, cause the system at least to perform:
establish the collaborative document editing environment at least by defining a plurality of users permitted to access the document in the collaborative document editing environment, where at least one user among the plurality of users is granted a right to edit the document,
monitor if the document is edited by the at least one user granted the right to edit the document,
generate, in response to a detection that the document is edited by the at least one user granted the right to edit the document, at least one notification, said at least one notification syndicating a plurality of edit events of the collaborative document editing environment performed by the at least one user granted the right to edit the document, and
transmit the at least one notification representing the syndication of said plurality of edit events to at least one recipient.

14. The system according to claim 13, wherein the system is configured to, in said monitoring if the document is edited by the at least one user granted the right to edit the document, perform an identification of an edit event performed to the document.

15. The system according to claim 13, wherein the system is configured to, in said monitoring if the document is edited by the at least one user granted the right to edit the document, store information on an edit event in a memory in a document-specific manner.

16. The system according to claim 13, wherein the system is configured to, in said monitoring if the document is edited by the at least one user granted the right to edit the document, store information representing time when an edit event is performed to the document.

17. The system according to claim 13, wherein the system is configured to, in said generating of the at least one notification, retrieve information on at least one edit event performed to the document from a memory.

18. The system according to claim 17, wherein the system is configured to, in said generating of the at least one notification, obtain information on at least one filtering scheme from a memory.

19. The system according to claim 18, wherein the system is configured to, in said generating of the at least one notification, filter the information on the plurality of edit events performed to the document according to the at least one filtering scheme.

20. The system according to claim 13, wherein the system is configured to perform said syndication by generating information of the notification so that it concludes the information of the plurality of edit events in a distilled manner.

21. The system according to claim 13, wherein the system is configured to, in said generating of the at least one notification, format a message comprising information on the the plurality of edit events through an application programming interface for at least one communication application.

22. The system according to claim 13, wherein the system is configured to perform said transmission of the at least one notification according to a time scheme defined in at least one filtering scheme stored in a memory.

23. The system according to claim 13, wherein the system is configured to transmit the at least one notification to at least one user according to information stored in a user profile of the at least one user.

24. The system according to claim 13, wherein the system is configured to select the recipient of the at least one notification from at least one of the following: at least one user granted an access the collaborative document editing environment, a third party external to the at least one user granted the access the collaborative document editing environment wherein the contact address of the third party is defined in a memory, a third party external to the at least one user granted the access the collaborative document editing environment wherein the contact address of the third party is associated to the document under edit.

25. The system according to claim 13, wherein the system is implemented with one of the following: a standalone server, a server network comprising a plurality of servers.

26. A processor-readable non-transitory medium storing processor-executable instructions for generating a notification relating to editing of a document in a collaborative document editing environment according to a method as defined in claim 1.

* * * * *